March 14, 1967  C. C. CONNELL  3,309,456
ABOVE GROUND TERMINAL TAP ENCLOSURE FOR SUBTERRANEAN CABLES
Filed July 14, 1964  3 Sheets-Sheet 1

INVENTOR
Clayton C. Connell

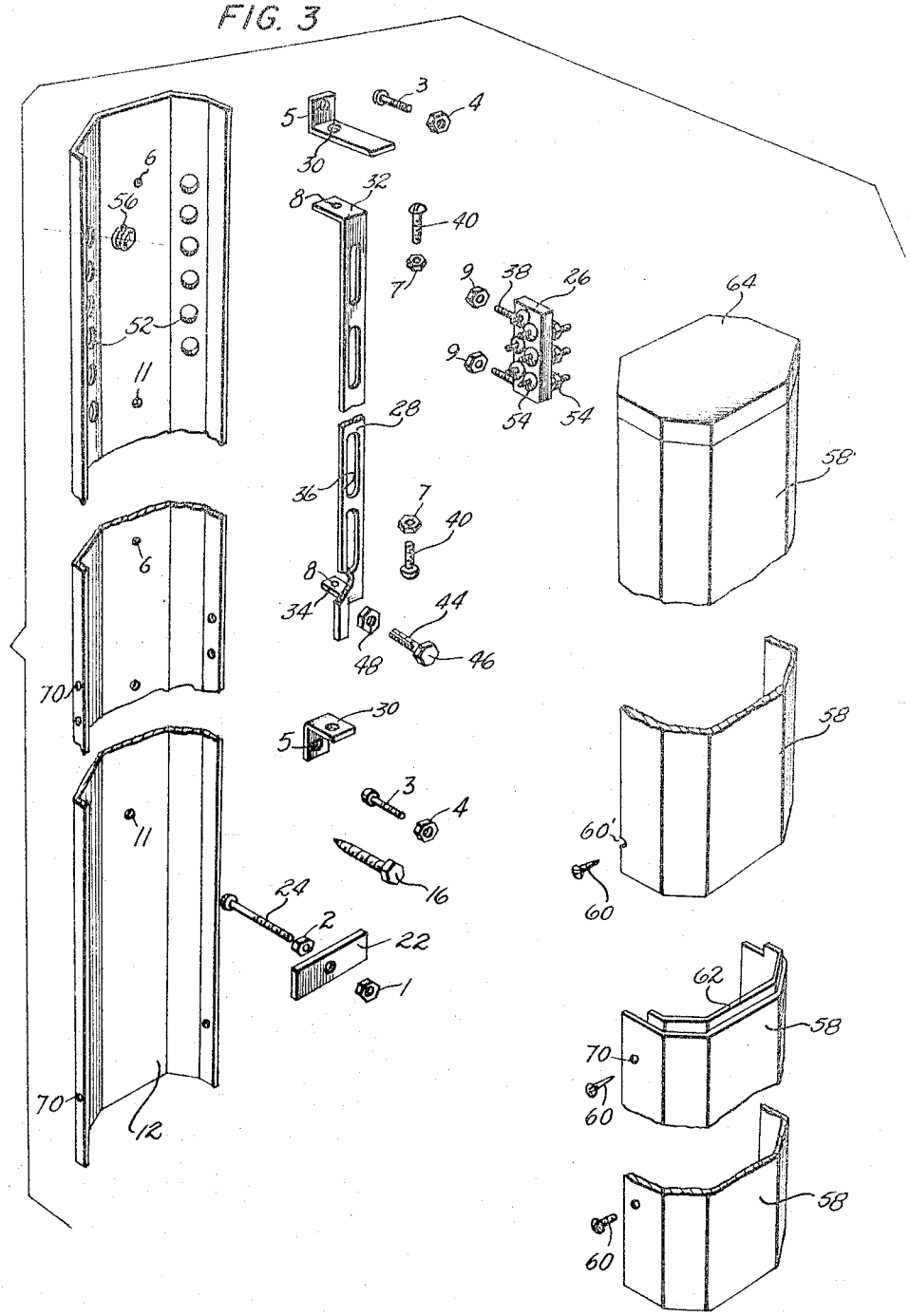

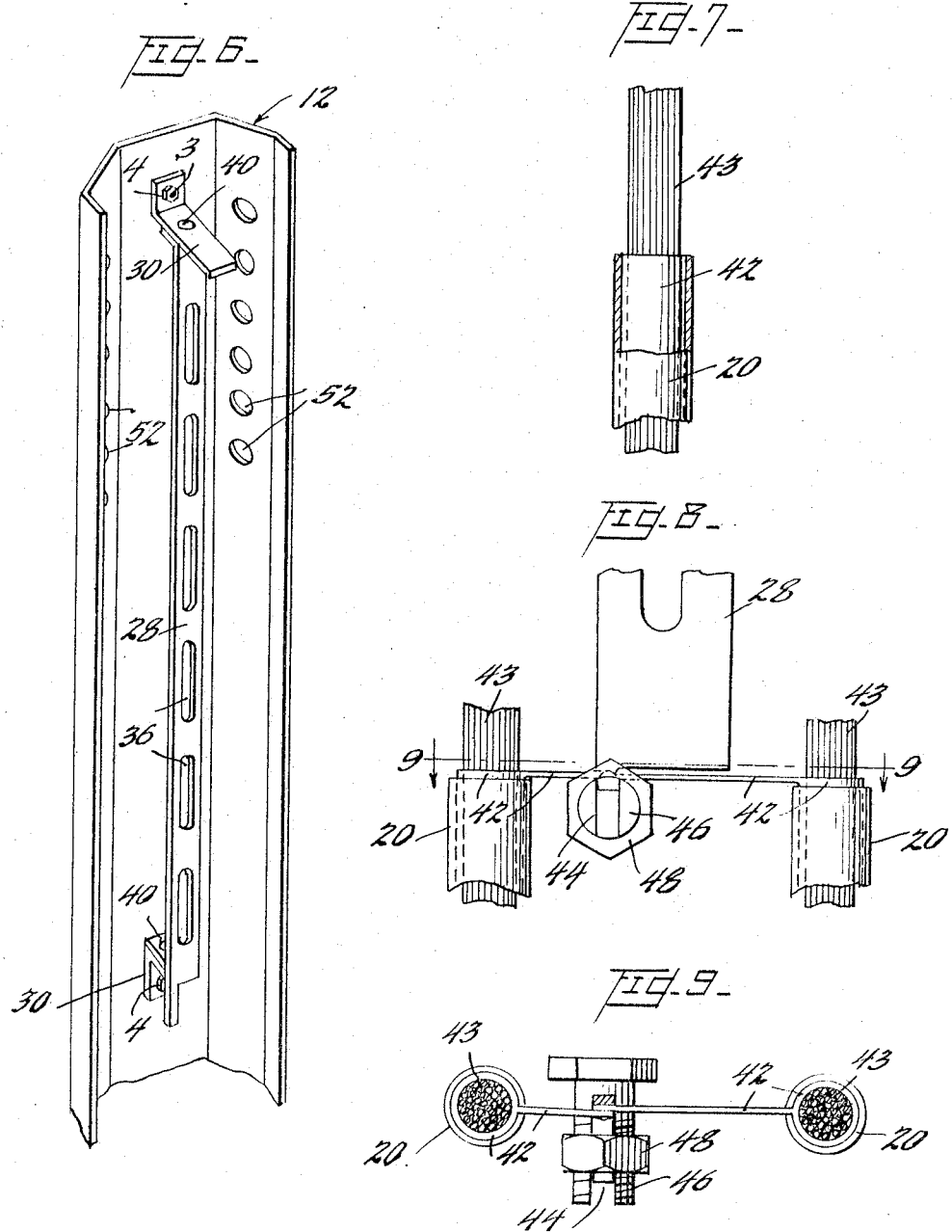

United States Patent Office 3,309,456
Patented Mar. 14, 1967

3,309,456
ABOVE GROUND TERMINAL TAP ENCLOSURE
FOR SUBTERRANEAN CABLES
Clayton C. Connell, P.O. Box 999,
Leesburg, Fla. 32748
Filed July 14, 1964, Ser. No. 382,510
9 Claims. (Cl. 174—38)

This invention relates to an above ground terminal tap enclosure for subterranean cables.

In recent years, and with the use of plastics, many types of cables have become available; this makes it feasible in supplying telephone service to place such cables underground, without the use of separate encasing conduits, with tapping loops placed at predetermined intervals above ground for connection to underground service lines or for connection to overhead service lines to the subscriber's telephone(s).

A further object of this invention is to provide a cable housing that is designed for mounting on a pole or a stub pole so that the service tap may be by aerial or underground methods.

My invention has another advantage, namely that it has a pivoting bracket for holding the cable block, which pivoting bracket may be turned at a 90 degree angle to either side from its true position, or a total of 180 degrees, without the necessity of its removal from the housing assembly. This makes it possible for the terminal block to be easily and quickly installed. In all similar types of terminal housing assemblies known to the applicant, the bracket for holding the cable block is stationary or fixed, which condition requires the disassembling of the entire bracket from the housing assembly, in order to connect or disconnect the end of the cable to the cable block.

An additional advantage of the structure of the present invention is that there is a continuous grounding between the terminal block bar and the ground wire attached to the said bar by means of a split ground lug, which latter slips over the bottom end of the bar and is fastened in place. By such close fittings of the split ground lug and the terminal block bar there is very little intervening space for corrosion (for all practical purposes even eliminates corrosion), and the subsequent interruption of a continuous grounding. In the similar types of construction known to the applicant, two plates are usually bolted together for a ground, and the space between these plates is highly susceptible to corrosion, which condition prevents grounding. The end result of improper grounding is the interruption of telephone communications, and the endangering of the telephone equipment by lightning or by any induced A.C. power which may accidentally come into contact with the telephone cables or wires.

Although it is not asserted for the present invention that it eliminates the danger of lightning to the telephone equipment, it provides a more positive ground for such cable housing assemblies, and enables there to be better telephone service than does similar terminal housing assemblies for telephone cables.

Another object of this invention is to provide a base for the tap housing to be manufactured of an angle, so that the housing does not mount flush with the pole or stub pole, thereby easily permitting the connection or reconnection of the service lines to the supply cable.

These aforesaid objects together with other objects and advantages, which will become subsequently apparent, reside in the several features as more fully hereinafter described and claimed, reference being had to the accompanying drawings forming a part hereof, wherein like numerals refer to like parts throughout.

FIG. 3 is a perspective exploded view of the parts of the tap enclosure embodying the invention;

FIG. 6 is a perspective view of the rear channel-shaped member of the tap enclosure with the pivoted, slotted member mounted thereon.

FIG. 7 is a detailed view of a portion of the cable and its coverings.

FIG. 8 is a detailed elevated view, showing the connection between the cable shield and the vertical bracket.

FIG. 9 is a sectional view along line 9—9 of FIG. 8.

Figure 1:
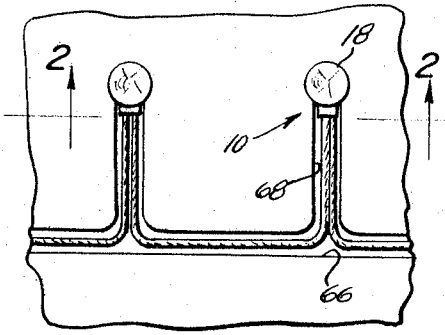
FIG. 1 is a diagrammatic view of the top of two pole mounts showing the position of the cables and service drop lines i.e., the layout.
Figure 4:
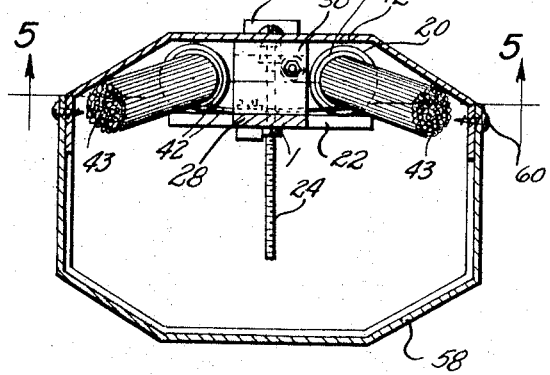
FIG. 4 is a horizontal sectional view taken on the line 4—4 of FIG. 2.
Figure 5:
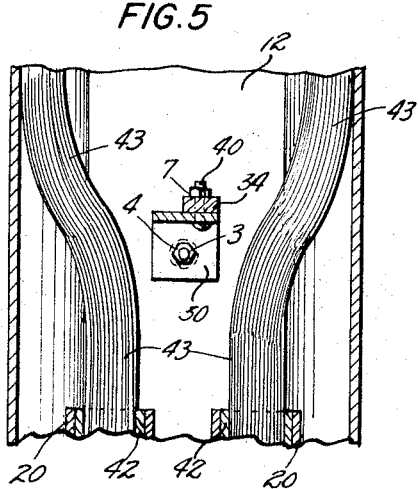
FIG. 5 is a detailed vertical sectional view taken on the line 5—5 of FIG. 4.

Referring now to the drawings in detail more particularly to FIGS. 1, 4 and 6, the tap enclosure assembly 10 includes an elongated generally channel-shaped rear member 12 of sheet metal or equivalent material having a pair of thick, metal pads or blocks 14 welded to the rear outside for reinforcement. There are two holes, numbered 11, through the channel-shaped member 12 and the respective pads 14 for receiving lag bolts 16 which secure the channel-shaped member 12 to a vertical pole or stub pole 18, extended below ground level as indicated in FIGURE 2.

Figure 2:
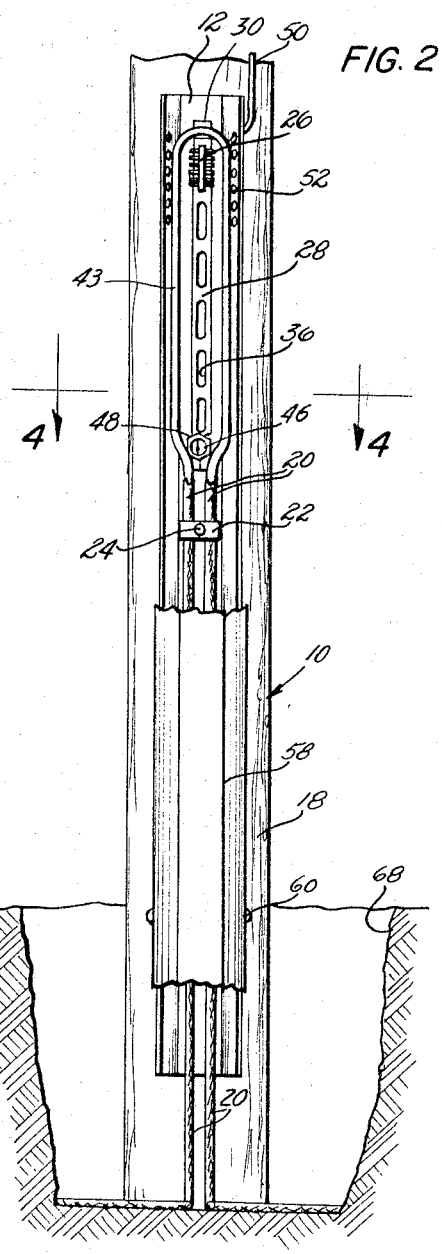
FIG. 2 is a vertical cross-sectional view taken on the line 2—2 of FIG. 1 showing an enclosure embodying the invention, partly in full and partly in section.

A cable sheath 20 is supported and retained in place by a retaining bar 22 and a screw 24 cooperating with nuts, numbered 1 and 2, which screw extends through lower hole, numbered 11 in the rear channel member 12, as shown in FIGURES 2, 3 and 4.

As shown in FIGS. 2 and 3, especially in FIG. 3, a terminal block 26 of insulative material is supported on an elongated vertical, metal bracket 28 mounted on member 12 by a pair of vertically spaced L-shaped brackets 30 having one leg thereof attached by means of screws 3 and nuts 4 to the channel-shaped member 12, the screws 3 extending through both the respective holes 5 in the brackets 30 and the respective holes 6 in channel-shaped member 12, and the other (horizontal) legs of the respective brackets 30 attached to lugs 32 and 34 at the ends of the elongated, vertical bracket 28 by means of screws 40 and nuts 7; the screws extend through the respective holes 8 in the horizontal leg of bracket 30. The bracket 28 has a plurality of longitudinal slots 36 therein for receiving bolts 38 which project through said slot 36; and the terminal block 26 is made fast to the bracket 28 by means of nuts 9. There may be a plurality of these terminal blocks 26 similarly fastened to bracket 28. Also, bracket 28 is capable of pivoting about a vertical axis defined by fasteners 40 for movement in an arc of 180 degrees. It is clear from the drawing that the elongated, vertical bracket member 28 may be turned about the bolts 40, which act as a pivot, so as to bring it to a position in which it is readily accessible from either side for installation of the terminal block 26 and connection of the ends of bare wires to the terminal contacts 54 thereon.

As shown in FIGS. 3, 8 and 9, the cable shield 42 is disposed in a slot 44 in ground lug 46 which is attached to the lower projection of bracket 28 by retaining nut 48 thus grounding the bracket 28. Wires 43 are surrounded by metallic shield 42, the latter in turn covered by a sheath 20, which may be rubber, plastic or other suitable material.

The service drop line 50 as shown in FIG. 2 of the drawing, passes through one of the holes 52, provided with grommet 56, in member 12; and the bare ends of the service drop line 50 are connected to the terminal contacts 54 as are wires 43 of the cable too, on the terminal block 26 in a conventional manner. Grommets 56 may be provided for each hole 52 in order to seal the hole and prevent entry of nest building insects and the like.

The front of the terminal tap enclosure consists of an outer front member 58, which is a cover that telescopically engages the channel-shaped member 12 and is held in place by screws 60 extending through holes 70 in the channel-shaped member 12 in the overlapping flanges thereof. The upper end of the lower section of cover 58 is provided with an extension strip 62 on the inner surface thereof for underlying the lower end of the upper section of the cover 60. Also, the upper section of the cover 60 is provided with a closure cap 64 which is welded outside at the top or otherwise secured in place so that the cover 60 is effectively sealed to the member 12 to form a hollow housing for receiving the cable sheath 20 and all the parts of the assembly referred to in the second paragraph coming after reference to the figures of the drawing, including the vertical bracket 28 and terminal blocks 26.

In using the invention, as is more particularly shown in FIGS. 1 and 2 a trench 66 is dug or plowed and lateral trenches 68 branch out from trench 66. The cable is placed in trench 66 and looped into branch trenches 68 to the poles 18. The loops are brought up poles 18 and inserted through the openings in the bottom of the completed terminal housing assembly 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An above ground terminal tap enclosure for subterranean cables comprising an elongated channel-shaped member adapted to be mounted on a supporting post, an elongated bracket having a horizontal portion at both of its upper and lower ends with a hole in each horizontal portion, and having not less than one elongated, vertical slot therein and being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the elongated, vertical bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface thereof for receiving service lines.

2. An above ground terminal tap enclosure for subterranean cables comprising an elongated channel-shaped member adapted to be mounted on a supporting post, an elongated bracket having a horizontal portion at both of its upper and lower ends with a hole in each horizontal portion, and having not less than one elongated, vertical slot therein and being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the elongated, vertical bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines, said holes including a sealing grommet to prevent entry of insects.

3. An above ground terminal tap enclosure for subterranean cables comprising an elongated channel-shaped member adapted to be mounted on a supporting post, an elongated bracket having a horizontal portion at both of its upper and lower ends with a hole in each horizontal portion, and having not less than one elongated, vertical slot therein and being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the elongated, vertical bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines said elongated bracket having a ground lug attached thereto at its lower end, the ground lug having a slot for receiving a cable shield.

4. An above ground terminal tap enclosure for subterranean cables comprising an elongated channel-shaped member adapted to be mounted on a supporting post, an elongated bracket having a horizontal portion at both of its upper and lower ends with a hole in each horizontal portion, said bracket being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the horizontal bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines, said bracket being provided with elongated vertical slots therein for adjustably mounting a plurality of terminal blocks.

5. An above ground terminal tap enclosure for subterranean cables comprising an elongated channel-shaped member adapted to be mounted on a supporting post, an elongated bracket having a horizontal portion at both of its upper and lower ends with a hole in each horizontal portion, said bracket being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the horizontal bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines, said elongated channel member including a pair of attaching pads on its rear surface for engaging a supporting post for reinforcing the member.

6. An above ground terminal tap enclosure for subterranean cables, as set out in claim 4, including means for removably securing the cover to the channel-shaped member, and a top cap of corresponding angular configuration to snugly fit over the assembled channel member and cover to protect the interior of the terminal housing.

7. An above ground terminal tap enclosure for subterranean cables comprising an elongated channel-shaped member adapted to be mounted on a supporting post, an elongated bracket having a horizontal portion at both of its upper and lower ends with a hole in each horizontal portion, said bracket being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the horizontal bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines, including a retaining bar attached to the inside surface of the channel-shaped member for securing the cable in place in the housing assembly.

8. An above ground terminal tap enclosure for subterranean cables comprising an elongated channel-shaped member adapted to be mounted on a supporting post, an elongated bracket having a horizontal portion at both of its upper and lower ends with a hole in each horizontal portion, said bracket being mounted on the inside surface of the upper portion of the said channel-shaped member by a spaced pair of L-shaped brackets each of which has a hole in the horizontal portion thereof, a pin extending through each of the two aligned holes thus connecting the two L-shaped brackets to the horizontal bracket for pivotal movement about a vertical axis, at least one terminal block of insulative material mounted on said bracket which block has terminal contacts for connecting underground cables to a service line, and a removable cover for said channel-shaped member for telescopically engaging the same, said channel-shaped member having angulated surfaces with holes in an angulated surface for receiving service lines, said cover being sectional and provided with overlapping end portions for retaining the sections in alignment.

9. An above ground terminal tap enclosure for subterranean cables as set out in claim 8, wherein the upper end of the lower section of the cover has an extension strip on the inner surface thereof for underlying the lower end of the upper section of the cover.

References Cited by the Examiner

UNITED STATES PATENTS

| | | | |
|---|---|---|---|
| 570,168 | 10/1896 | Greenfield | 174—37 |
| 2,541,363 | 2/1951 | Jungjohann | 248—282 |
| 3,164,668 | 1/1965 | Skubal | 174—37 X |

LARAMIE E. ASKIN, *Primary Examiner.*

J. F. RUGGIERO, *Assistant Examiner.*